United States Patent
Franson et al.

(10) Patent No.: US 6,995,404 B2
(45) Date of Patent: Feb. 7, 2006

(54) TECHNIQUES FOR QUANTUM PROCESSING WITH PHOTONS AND THE ZENO EFFECT

(75) Inventors: James D. Franson, Ellicott City, MD (US); Bryan C. Jacobs, Sykesville, MD (US); Todd B. Pittman, Ellicott City, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/879,853

(22) Filed: Jun. 29, 2004

(65) Prior Publication Data

US 2005/0117836 A1    Jun. 2, 2005

Related U.S. Application Data

(60) Provisional application No. 60/513,402, filed on Oct. 22, 2003.

(51) Int. Cl.
*H01L 29/22* (2006.01)

(52) U.S. Cl. .................... 257/98; 257/79; 359/107; 359/108; 708/191; 708/816; 708/831

(58) Field of Classification Search .............. 257/79, 257/98; 359/107, 108; 708/191, 816, 831
See application file for complete search history.

(56) References Cited

OTHER PUBLICATIONS

Duan et al., "Prevention of dissipation with two particles", Phys. Rev. A, v. 57, No. 4, p. 2399, Apr. 1998.*
Yang et al., "Error-prevention scheme with two pairs of qubits", Phys. Rev. A, v. 66, 034301, 2002.*
Hwang et al., "Efficient schemes for reducing imperfect collective decoherences", Phys. Rev. A, v. 62, 062305, 2000.*
Sidles, The AC Stark, Stern-Gerlach, and Quantum Zeno Effects in Interferometric Qubit Readout, arXiv:quant-ph/9612001 v1, Nov. 28, 1996.*

* cited by examiner

*Primary Examiner*—Nathan J. Flynn
*Assistant Examiner*—Scott R. Wilson
(74) *Attorney, Agent, or Firm*—Francis A. Cooch

(57) ABSTRACT

Techniques are provided that use the quantum Zeno effect to implement practical devices that use single photons as the qubits for quantum information processing. In the quantum Zeno effect, a randomly-occurring event is suppressed by frequent measurements to determine whether the event has occurred. The same results can be obtained by using atoms or molecules or ions to react to the occurrence of the event. Techniques include directing one or more input qubits onto a device and applying a quantum Zeno effect in the device. The quantum Zeno effect is applied by consuming one or more photons in the device under conditions in which photons, that would otherwise be output by the device, do not represent a result of a particular quantum information processing operation. Devices implemented using the quantum Zeno effect can operate with low error rates without the need for high efficiency detectors and large number of ancilla.

21 Claims, 6 Drawing Sheets

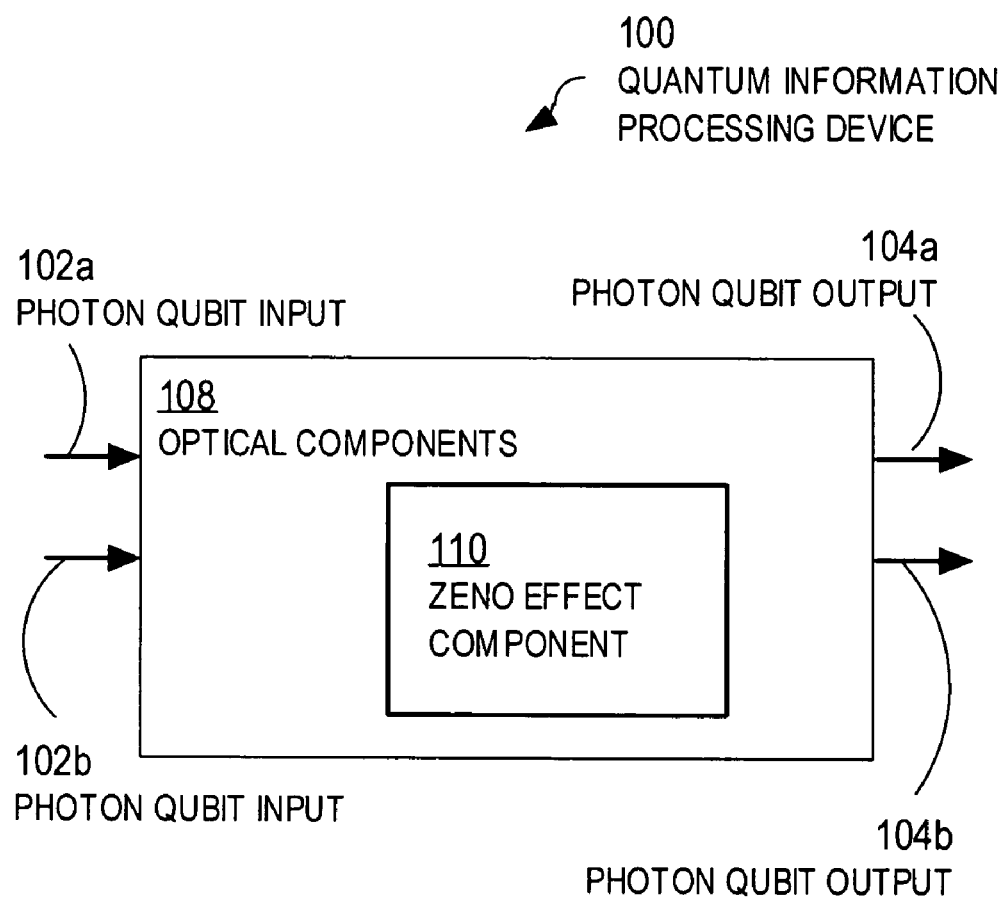

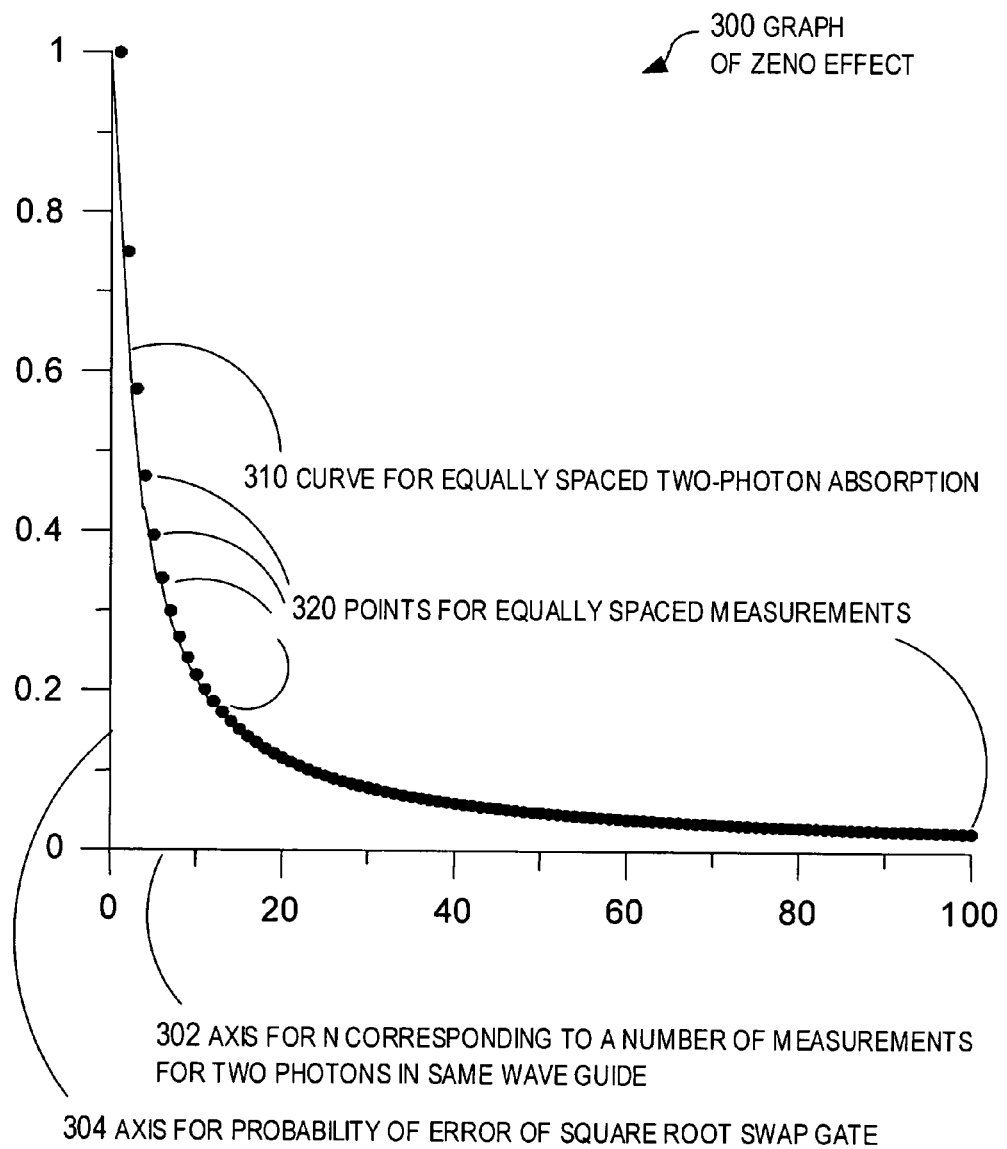

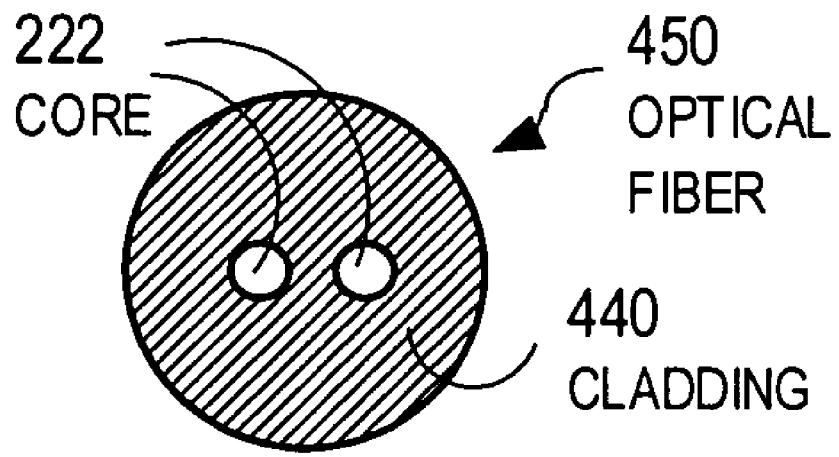
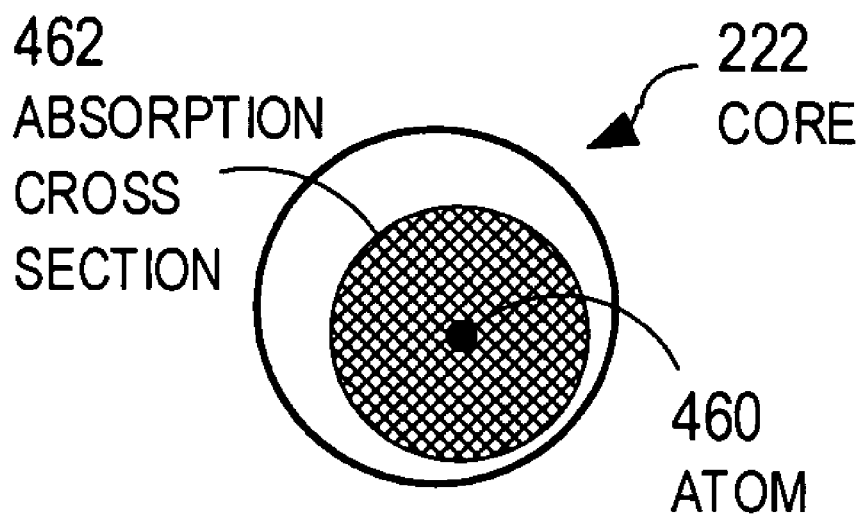

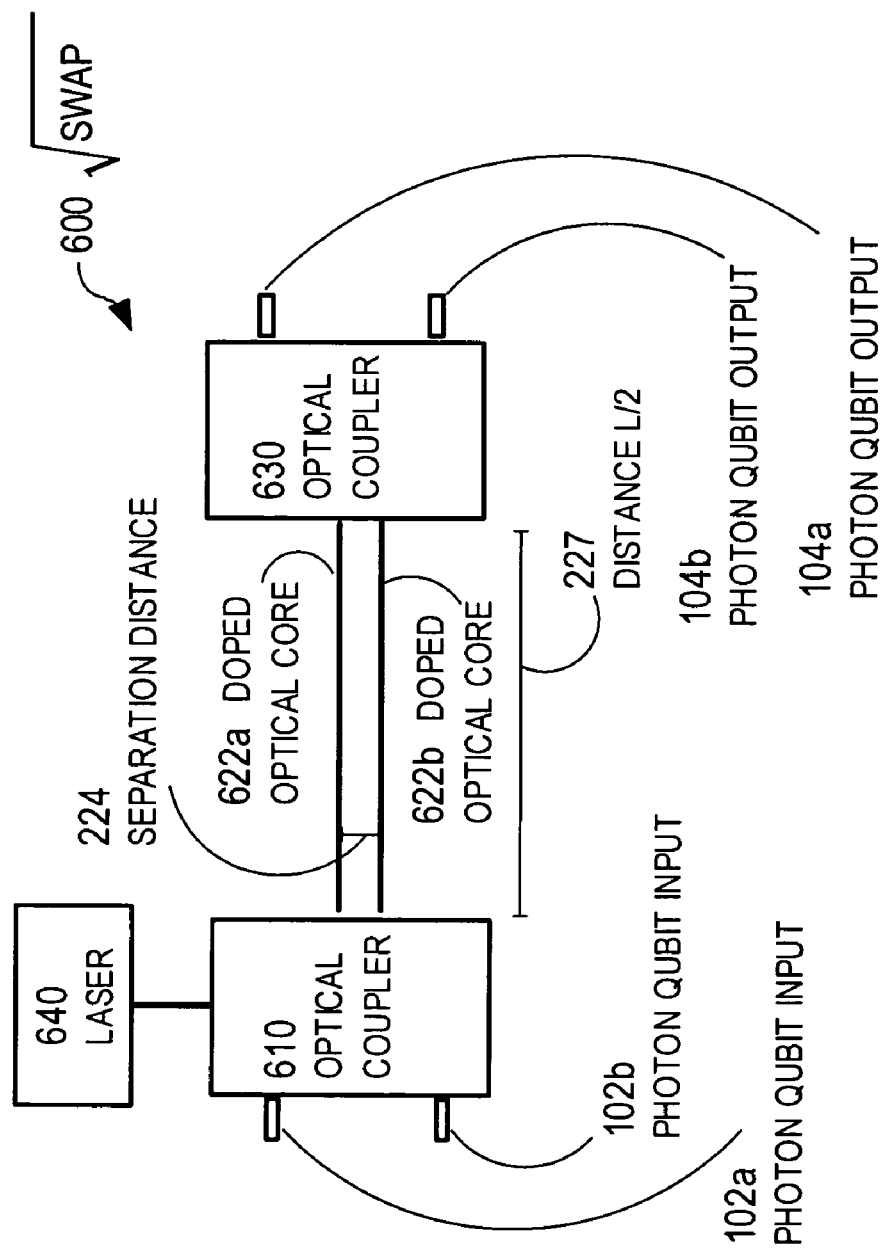

TECHNIQUES FOR QUANTUM PROCESSING WITH PHOTONS AND THE ZENO EFFECT

CROSS-REFERENCE TO RELATED APPLICATIONS

This application claims benefit of Provisional Appln. 60/513,402, filed Oct. 22, 2003, under 35 U.S.C. §119(e).

STATEMENT OF GOVERNMENTAL INTEREST

This invention was made with Government support under Contract No. DAAD190210069 awarded by the Army Research Office. The Government has certain rights in the invention.

BACKGROUND OF THE INVENTION

1. Field of the Invention

The present invention relates to quantum information processing, and, in particular, to techniques for reducing the complexity of quantum processing on quantum bits (qubits) represented by quantum states of single photons.

2. Description of the Related Art

Information processing using classical computers relies on physical phenomena, such as magnetic fields, voltages, and optical intensity that can be produced and measured in each of two basis states, one basis state representing a zero and another basis state representing a one. Each physical element that can achieve either of these two states represents one binary digit, called a bit. Quantum information processing uses physical elements that exhibit quantum properties that may include, not only one of the two or more basis states, but also an arbitrary superposition state of the basis states. A superposition state has some non-zero probability of being measured as one of the basis states and some non-zero probability of being measured as another of the basis states. A physical element that exhibits quantum properties for two basis states represents one quantum bit, also called a qubit. Physical elements that are suitable for representing qubits include the spins of single electrons, electron states in atoms or molecules, nuclear spins in molecules and solids, magnetic flux, spatial propagation modes of single photons, and polarizations of single photons, among others.

Logical operations performed on qubits apply not only to the basis states of those qubits but also to the superposition states of those qubits, simultaneously. Quantum computers based on logical operations on systems of qubits offer the promise of massively simultaneous processing (also called massively parallel processing) that can address problems that are considered intractable with classical information processing. Such classically intractable problems that can be addressed with quantum computers include simulation of quantum interactions, combinatorial searches of unsorted data, finding prime factors of large integers, solving for cryptographic keys used in current secure communication algorithms, and truly secure communications (also called "quantum cryptography").

Several approaches use single photons to represent qubits. In many respects, single photons are advantageous for serving as qubits in a quantum computer. Photons can be easily generated and manipulated. Optical fibers can be used to make connections in analogy with the wires of a conventional computer; while most other phenomena representing qubits interact only with nearest neighbors. Photons interact only weakly with the environment because photons have no charge and no rest mass. The main difficulty in an optical approach has been the implementation of quantum logic gates due to the weak interaction between individual photons.

One approach uses linear interactions between single photons but relies on interferometer techniques, e.g., interference on two spatial modes of propagation for a single photon. These devices are called "probabilistic" logical gates because they perform the desired logical operation in response to only a fraction of the input photons. However, it can be determined when an operation is performed successfully, so that, in a separate step often called a "post selection" step or a "post-detection selection" step, output photons are blocked unless the operation is successfully performed. It has been shown that the fraction can be increased close to a value of one with sufficient numbers of components and extra photons (called "ancilla photons" or "ancilla") in particular states.

While suitable for many purposes, logical gates based on this approach suffer thermally induced phase shifts between photons taking different paths. In addition, this approach suffers from complexity introduced to generate and manipulate a large number of ancilla. Also, such approaches are subject to errors in the detectors used to detect ancilla photons during the post selection step.

In a more recent approach, logical devices that operate on the polarization states of single photons have been proposed that do not suffer thermally induced phase shifts and that do not require as large a number of ancilla and additional components and resources. This approach is described, for example, in U.S. patent application Ser. No. 10/286,735, filed Nov. 1, 2002, entitled "Techniques for Performing Logic Operations Using Quantum States of Single Photons," by Todd B. Pittman, James D. Franson and Bryan C. Jacobs (hereinafter referenced as "Pittman").

In another recent approach, the number of ancilla is decreased by proper generation of an entangled state for the ancilla selected to reduce errors. This approach is described, for example, in U.S. patent application Ser. No. 10/651,317, filed Aug. 28, 2003, entitled "Techniques For High Fidelity Quantum Teleportation And Computing," by James D. Franson, Michelle Donegan, Michael Fitch, Bryan C. Jacobs and Todd B. Pittman, (hereinafter referenced as "Franson").

While representing advances over prior techniques, the recent approaches still sometimes use a large number of ancilla and therefore suffer to some degree from the complexity introduced to generate and manipulate those ancilla. Also, these recent approaches are sometimes also subject to errors in the detectors used to detect the ancilla photons during a post selection step.

Based on the foregoing description, there is a clear need for techniques that reduce the complexity of quantum logic operations on qubits represented by single photons, which techniques do not suffer the deficiencies of current approaches. In particular, there is a clear need for techniques that reduce the reliance on ancilla while performing quantum information processing.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided that use the quantum Zeno effect to implement practical devices that use single photons as the qubits for quantum information processing. In the quantum Zeno effect, a randomly-occurring event can be suppressed by frequent operations akin to measurements to determine whether or not the event has occurred. No actual observations are required; the same results can be obtained by using atoms or molecules to react to the occurrence of the event. Devices implemented using the quantum Zeno effect can operate with low error rates without the need for high efficiency detectors and large number of ancilla.

According to one aspect of the invention, a method for quantum information processing includes directing one or more input qubits onto a device and applying a quantum Zeno effect in the device. Each qubit is represented by a superposition state of a single photon. The quantum Zeno effect is applied by consuming one or more photons in the device (such as by absorbing a photon, causing a non-linear phase shift in the photon, or measuring the photon) under conditions in which one or more output photons, that would otherwise be output by the device, do not represent a result of a particular quantum information processing operation on the one or more input qubits.

In an embodiment of this aspect, at least two qubits are directed onto the device, and the particular quantum information processing operation includes a square root of a SWAP operation. In some such embodiments, the one or more photons are consumed by absorbing a pair of substantively coincident photons in one spatial mode through the device without absorbing a solo photon in the same spatial mode.

In another aspect of the invention, a device for quantum information processing using a superposition state of a single photon to represent a qubit includes an input port, an output port, and a Zeno effect component. The input port receives one or more input qubits; and the output port sends one or more output qubits. The Zeno effect component is positioned between the input and output ports. The Zeno effect component applies a quantum Zeno effect by consuming one or more photons under conditions in which photons on the output port would otherwise not represent a result of a particular quantum information processing operation on the one or more input qubits.

In another aspect of the invention, a method of fabricating a Zeno effect component for quantum information processing includes forming a pair of wave guides and disposing a plurality of absorbing units in each wave guide. A superposition state of a single photon having a particular energy represents each qubit. The pair of wave guides are separated by a sufficiently small separation distance for a particular distance in a direction of propagation such that a SWAP operation would occur in twice the particular distance for a single test photon having the particular energy. Each absorbing unit includes an atom, a molecule, an ion, or some combination, that has an excited state which is matched to twice the particular energy and which state is not matched to the particular energy.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a quantum information processing device according to an embodiment;

FIG. 3 is a graph that illustrates the Zeno effect on a failure mode of the square root SWAP device of FIG. 2B, according to an embodiment;

FIG. 4A is block diagram that illustrates a cross section of a optical fiber of the square root SWAP device of FIG. 2B;

FIG. 4B is block diagram that illustrates a cross section of a core of an optical fiber of a square root SWAP device that applies the quantum Zeno effect, according to an embodiment;

FIG. 6 is a block diagram that illustrates a square root SWAP gate using the quantum Zeno effect, according to an embodiment.

DETAILED DESCRIPTION

Figure 2A:
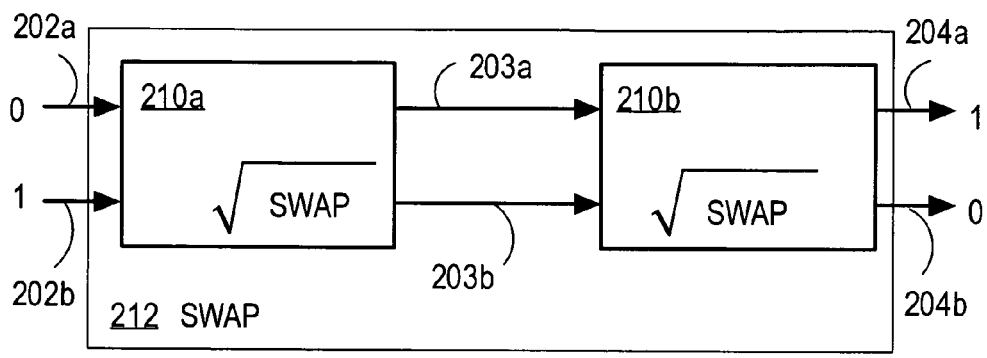
FIG. 2A is a block diagram that illustrates two square root SWAP devices that together perform a SWAP operation.

A method and apparatus are described for quantum information processing using the quantum Zeno effect. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FIG. 1 is a block diagram that illustrates a quantum information processing device 100 according to an embodiment. The device 100 includes photon qubit input ports, such as qubit input ports 102a, 102b, collectively referenced hereinafter as qubit input ports 102, for receiving qubits represented by photons. The device 100 also includes photon qubit output ports, such as qubit output ports 104a, 104b, collectively referenced hereinafter as qubit output ports 104, for sending qubits represented by photons that indicate the results of the quantum information processing performed by device 100. In other embodiments, more or fewer input ports or output ports or both are included in device 100.

The qubit input ports 102 and output ports 104 are connected by one or more optical components 108, including at least one Zeno effect component 110. The optical components 108 direct one or more photons to the Zeno effect component 110 in response to receiving one or more photons at the qubit input ports 102. The optical components 108 also direct one or more photons from the Zeno effect component 110 to the qubit output ports 104.

The Zeno effect component 110 applies the quantum Zeno effect to effectively make measurements to determine whether one or more modes of failure for the device 100 has occurred. By making measurements to determine whether a failure mode has occurred in component 110, the Zeno effect reduces the chances of that failure occurring. Consequently, the device 100 is more likely to produce the desired quantum information processing result. The Zeno effect has previously been proposed as a way to perform quantum error correction on output from quantum logic gates, but not to construct the logic gates themselves, as described here.

As stated above, in the quantum Zeno effect, a randomly-occurring event (such as a failure mode of device 100) can be suppressed by frequent operations akin to measurements to determine whether or not the event has occurred. No actual observations are required; therefore the effectiveness of the Zeno effect does not depend on detector efficiency. The same results can be obtained by using atoms or molecules or ions or some combination to react to the occurrence of the event. Devices implemented using the quantum Zeno effect can operate with low error rates without the need for high efficiency detectors or large number of ancilla or a combination of the two.

In the following description, embodiments of the invention are described in the context of a gate that performs a square root SWAP operation on two input qubits, but the invention is not limited to this context. Embodiments of the invention may also be used in gates that perform single qubit operations, and other two qubit operations, such as the controlled NOT (CNOT) operation well known in the art, and other multiple qubit operations, such as the controlled CNOT (CCNOT) operation, also well known in the art.

The most general quantum computation can be performed using single-qubit logic gates, which can be easily implemented in an optical approach, combined with a suitable two-qubit gate, such as the CNOT. A useful two-qubit gate that can be used as a building block for other quantum processing gates, including the CNOT gate, is a square root SWAP gate. The square root SWAP is often designated by the symbol $\sqrt{SWAP}$.

FIG. 2A is a block diagram that illustrates two square root SWAP devices that together perform a SWAP operation. The SWAP operation itself interchanges the logical values of two input qubits, and it is easily implemented in a number of ways known in the art, including an approach described in more detail below with reference to FIG. 2B. In FIG. 2A, the SWAP gate 212 receives two input qubits on input ports 202a, 202b (collectively referenced hereinafter as qubit input ports 202). In an illustrated example, a qubit representing logical value 0 is received on qubit input port 202a, and a qubit representing logical value 1 is received on qubit input port 202b. The SWAP gate 212 outputs two output qubits on output ports 204a, 204b (collectively referenced hereinafter as qubit output ports 204) where these logical values are interchanged (i.e., "swapped"). In the illustrated example, a qubit representing logical value 0 is output on qubit output port 204b and a qubit representing logical value 1 is output on qubit output port 204a.

The $\sqrt{SWAP}$ gate is defined as giving the SWAP operation when applied twice (i.e., "squared"), as illustrated in FIG. 2A by two $\sqrt{SWAP}$ gates 210a, 210b connected in series. That is, the output qubits from gate 210a on optical paths 203a, 203b are sent as input to $\sqrt{SWAP}$ gate 210b. The $\sqrt{SWAP}$ is a purely quantum-mechanical operation and its implementation is nontrivial. Even for the case in which the logical values on input ports 202 are known, the logical values on the two optical paths 203a, 203b are unknown. The $\sqrt{SWAP}$ allows any quantum computation to be performed when combined with single-qubit operations, for example, the $\sqrt{SWAP}$ gate can be used to implement the more familiar controlled-NOT gate.

Figure 2B:
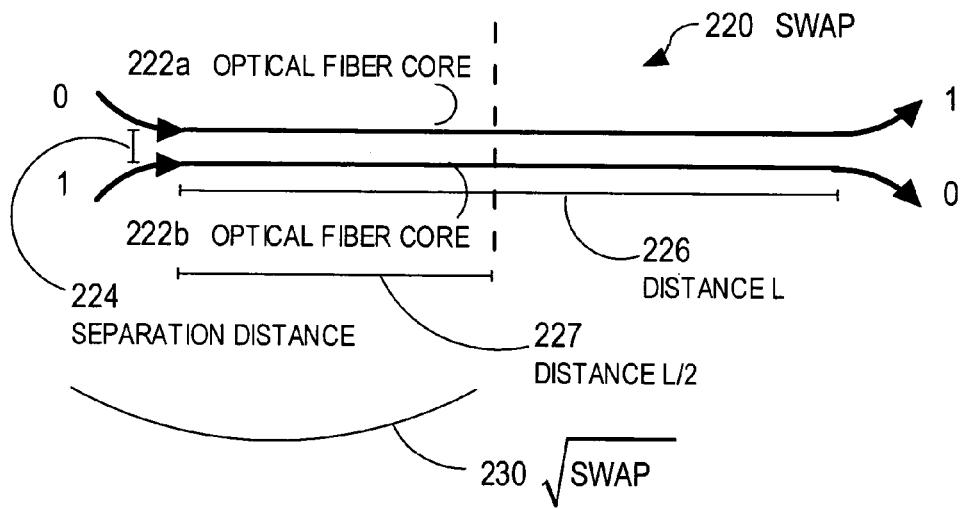
FIG. 2B is a block diagram that illustrates an example SWAP device and example square root SWAP device.

FIG. 2B is a block diagram that illustrates an example SWAP device and example square root SWAP device. Here the cores of two optical fibers 222a, 222b (collectively referenced hereinafter as optical fiber cores 222) are brought into close proximity over a distance L indicated by line segment 226. The cores are within a separation distance S of each other, indicated by line segment 224, over the distance L. A photon in one fiber core is weakly coupled into the other core by the evanescent fields of the photon. If L and S are chosen properly, a photon incident in one of the fiber cores, e.g., 222b will be completely transferred to the other fiber core, e.g., 222a. This process implements the SWAP operation if the presence of a photon represents the logical value 1 and the absence of a photon represents the logical value 0.

In an illustrated embodiment, the $\sqrt{SWAP}$ operation is implemented as $\sqrt{SWAP}$ gate 230 by shortening the length of the interaction region to a length $L_{1/2}=L/2$, as illustrated by the line segment 227 extending to a vertical dashed line. The $\sqrt{SWAP}$ gate 230 produces an operation that, when applied twice, may be expected to give the SWAP operation, as desired. Commercially-available devices with similar structures are used as 50/50 couplers and are equivalent to free-space beam splitters.

It can be shown that the coupled-fiber $\sqrt{SWAP}$ gate 230 of FIG. 2B does implement a $\sqrt{SWAP}$ operation correctly if a total of 0 or 1 photons are input to the device on optical fiber cores 222a, 222b. Incorrect results are obtained, however, if a photon is present in both of the input ports, which corresponds to a logical input of 1 for both qubits. In that case, there is some probability that both photons will exit the device in the same fiber core, which corresponds to a failure mode, since only 0 or 1 photons represents a valid logical output. In fact, quantum interference effects ensure that both photons will always exit such a $\sqrt{SWAP}$ gate 230 in the same fiber core, which is equivalent to the well-known Hong-Ou-Mandel dip in coincidence measurements using free-space beam splitters (see, for example, C. K. Hong, Z. Y. Ou, and L. Mandel, "Measurement of subpicosecond time intervals between two photons by interference," *Phys. Rev. Lett.*, vol 59, p2044, 1987).

According to illustrated embodiments of the invention, the quantum Zeno effect is used to inhibit the production of these kinds of failure modes (rather than to correct errors after they are produced). The action of the Zeno effect is akin to the notion that "a watched pot never boils," which actually has an element of truth in quantum mechanics. On the human scale, the notion is merely an exaggeration of a perception.

The following descriptions based on theory are provided to help explain the quantum Zeno effect; however, the invention is not limited by the theory presented in the following descriptions. For purposes of illustration, it is assumed that N equally-spaced measurements are performed to determine whether or not two photons are present in the same fiber core at overlapping times (i.e., to determine whether there are two coincident photons). The N measurements are performed during a time interval $\Delta t=L_{1/2}/c$ in which the photons interact, where c is the speed of light. It is also assumed that the measurement process has no effect on the device unless two photons are found to be present in the same fiber core.

FIG. 3 is a graph 300 that illustrates the Zeno effect on a failure mode of the square root SWAP device 230 of FIG. 2B, according to the illustrated embodiment. The vertical axis 304 indicates the probability $P_E$ of the failure mode occurring, i.e., the probability that the device produces an undesirable result due to this failure mode when two photons are input to the device. The horizontal axis indicates the number N of equally spaced measurements during the time interval Δt. The dots 320 indicate the effects of the sequence of N measurements describe above. It can be seen that $P_E=1$ if a single measurement is made at the end of the process, which is consistent with the Hong-Ou-Mandel dip mentioned above. But $P_E$ is inversely proportional to N in the limit of large N, as would be expected from the quantum Zeno effect. In the limit of large N, the output of the device can be shown to be that of a $\sqrt{\text{SWAP}}$ gate. A strong Zeno effect clearly prevents two photons from occupying the same mode at overlapping times, i.e., prevents "coincident photons." There is an additional phase shift that is not included in the usual definition of $\sqrt{\text{SWAP}}$, but that does not cause any difficulties for practical implementations. These calculations are based on applying standard quantum measurement theory and by integrating Schrodinger's equation over a time interval between measurements (e.g., Δt/[N−1]).

The quantum interference effects responsible for the Hong-Ou-Mandel dip and the value of $P_E=1$ in the absence of the Zeno effect (left-most point on graph 300) are due to the fact that photons are bosons. Electrons or other fermions would give just the opposite result, with both particles always exiting from different output ports. This difference in behavior can be traced to the fact that the exchange of two identical fermions multiplies the state vector by a factor of −1, whereas the exchange of two bosons gives a factor of +1, which converts an interference maximum to a minimum. It can be seen from FIG. 3 that the properties of the photons, at least as far as these interference effects are concerned, gradually change from that of a boson to that of a fermion as the strength of the Zeno effect is increased. A strong Zeno effect clearly prevents coincident photons, which is a fundamental property of fermions (as expressed in the well known Pauli exclusion principle).

As is usually the case in the quantum Zeno effect, it is not necessary to make any actual observations or measurements as described above. Instead, it suffices to introduce an interaction between the system of interest and some other system whose properties could, in principle, be measured at some later time in order to obtain the same information. One or more photons are "consumed" in such interactions by such virtual measurements in principle.

In another illustrated embodiment, the interaction with another system is accomplished by introducing one or more atoms into the fiber cores in such a way that the atoms can absorb two photons but not just one. In other embodiments other absorbing units are used, such as molecules, ions, and combinations of atoms and molecules and ions, or other interacting systems are used. For purposes of illustration, it is assumed that the quantum states corresponding to two photons in the same fiber core would undergo two-photon absorption at a rate of $1/\tau_D$, where $\tau_D$ is the corresponding decay time. The results of a density-matrix calculation of this kind are illustrated by the solid curve in FIG. 3. In order to allow both sets of calculations to be plotted on the same scale, the parameter N is defined in this case as $N=\Delta t/4\tau_D$. It can be seen that strong two-photon absorption can also suppress the coincident photons, thereby preventing failure modes of that kind.

Nonlinear effects such as two-photon absorption are commonly assumed to be small at single-photon intensities. According to some embodiments, however, the photons are confined inside the core of an optical fiber and two-photon absorption is substantial. An illustrated embodiment with a vapor of absorbing atoms in a hollow core optical fiber is described in more detail below. In other embodiments a solid core is suitably doped with atoms or molecules of an appropriately absorbing material.

In still other embodiments, the Zeno effect can be applied in quantum logic gates using a high-finesse cavity and nonlinear phase shifts rather than nonlinear absorption (see, for example, Q. A. Turchette, C. J. Hood, W. Lange, H. Mabuchi, and J. H. Kimble, *Phys. Rev. Lett.*, vol 75, p 4710, 1995). But nonlinear absorption is much easier to achieve than nonlinear phase shifts because nonlinear absorption allows operation on or near resonance, whereas nonlinear phase shifts require large detunings in order to avoid unwanted absorption. In addition, a nonlinear phase shift will vary over the length of a wave packet due to the variation in intensity, which will produce errors that are difficult to avoid. The nonlinear absorption described here is relatively large even at single-photon intensities due to a combination of effects, including the small diameter of the optical fiber cores, the relatively long length of the medium, and the ability to tune on or close to resonance, as described in more detail in the following.

For purposes of illustration, it is assumed that a hollow optical fiber contains a suitable atomic vapor. FIG. 4A is block diagram that illustrates a cross section of a dual optical fiber 450, such as may be used for both fiber cores 222 in the square root SWAP device 230 of FIG. 2B. The optical fiber 450 includes two cores 222 inside a common cladding 440. The difference in index of refraction between the cladding 440 and core 222 is chosen to cause the fiber to perform as a waveguide for the photons serving as qubits. In the illustrated embodiment, the cores 222 are hollow cores.

The absorption of a resonant photon by an atom can be described by a cross-sectional area that is comparable to the area of an optical fiber core (see, for example, L. Mandel and E. Wolf, *Optical Coherence and Quantum Optics*, Cambridge U. Press, Cambridge, 1995). A single photon will then be absorbed by a single atom in the fiber core with a probability that is on the order of unity. Once one photon has been absorbed, the atom will be left in an excited state with a similar cross-section, so that a second photon can then be absorbed with a probability that is also on the order of unity. Although a number of refinements are required to this simple picture, as described in more detail below, it does suggest that two-photon absorption can occur at a relatively high rate in optical fibers under the right conditions.

FIG. 4B is block diagram that illustrates a cross section of a core 222 of an optical fiber 450 of a square root SWAP device that applies the quantum Zeno effect, according to an embodiment. The core 222 includes an atom 460 that absorbs pairs of coincident photons used to represent qubits, but does not absorb single photons. The absorption cross sectional area 462 indicates the area where an impinging pair of coincident photons is absorbed. For the proper selection of photons and atoms, the cross sectional area can approach the cross sectional area of the core, as described below and illustrated in FIG. 4B. In an illustrated embodiment, the core 222 is hollow and the atom 460 is in a vapor phase. In other embodiments, the core 222 is solid, and the atom 460 is bound in the solid.

Practical applications depend on the achievable two-photon absorption rate. The following results from an analysis of the two-photon absorption rates show that useful rates are achievable in hollow optical fibers. The details of the calculations themselves are lengthy and are not necessary to make and use the invention. Practical issues associated with the implementation of Zeno gates in dual-core optical fibers are included.

As illustrated in FIG. 4B, the cross-section 462 for the resonant absorption of a photon can be comparable to the area A of an optical fiber core 222 for appropriate selection of absorbing unit (such as an atom, ion or molecule) and photon energy (which is proportional to photon wavenumber k and inversely proportional to photon wavelength $\lambda$). It is assumed for purposes of illustration that the absorbing unit is an atom. In the absence of collisions and Doppler shifts, the scattering cross-section $\sigma_0$ is given by Equation 1:

$$\sigma_0 = \frac{3}{2\pi}\lambda^2 \qquad (1)$$

where $\lambda$ is the wavelength of the light. The fiber core is selected to also have a cross sectional area on the order of $\lambda^2$. Therefore, the probability that a single photon will be absorbed by a single atom in the fiber core is $\sigma_0/A \sim 1$. For purposes of illustration, it is assumed that the energy of the photon is selected to match that of the excited atomic state, i.e. to equal the energy change between two quantum levels for the electrons in the atom. Once one photon has been absorbed, the atom will be left in an excited state with a similar cross-section, so that a second photon can then be absorbed with a probability that is also on the order of unity. This simple picture must be modified in several respects, however, as described below.

In order for Equation 1 to be valid, the frequency bandwidth of the photons must be less than that of the excited atomic state, which requires the length $L_P$ of the photon wave packets to be greater than $c\tau_A$, where $\tau_A$ is the lifetime of the relevant excited atomic state.

In order to avoid the absorption of single photons, the energy of the photons can be chosen to differ by an amount $\delta_1$ from the energy of the first excited atomic state. In that case, the absorption of two photons conserves energy while the absorption of one photon does not (absorption of one photon is a "virtual process" that is only conceptually allowed as a temporary intermediate step between allowed initial and final states, e.g., between an atom at energy level 1 and an atom at energy level 3).

Figure 5A:
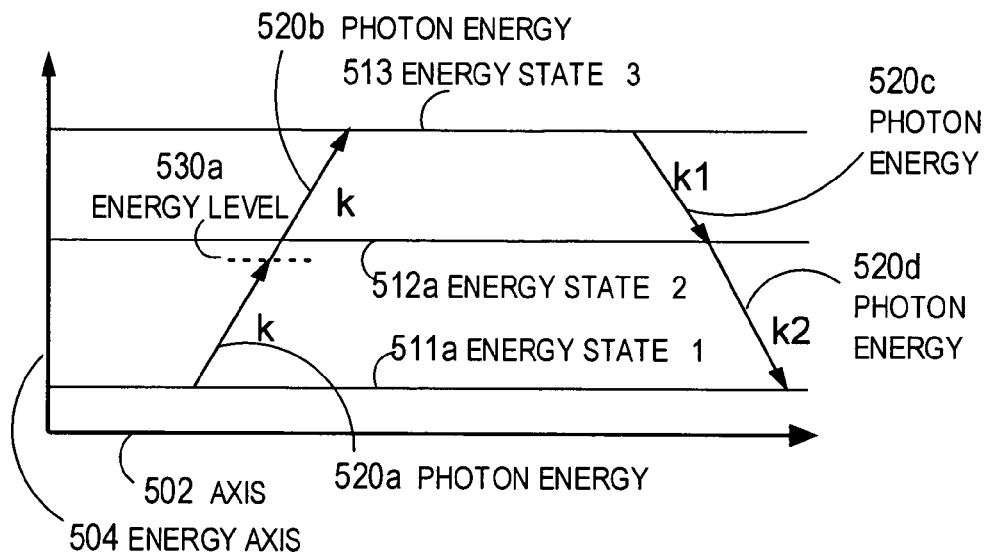
FIG. 5A is an energy diagram that illustrates the energy states of an absorbing atom for applying the Zeno effect by absorbing coincident photons but not single photons, according to an embodiment.

FIG. 5A is an energy level diagram that illustrates the energy states of an absorbing atom for applying the Zeno effect by absorbing coincident photons but not single photons, according to an embodiment. FIG. 5A illustrates the use of a three-level atom to produce two-photon absorption. The atomic energy states 511a, 512a, 513 represent atomic energy levels 1 through 3, respectively. The photon energies 520a, 520b, 520c, 520d are represented by arrows, the height of each arrow is proportional to the photon energy of the corresponding photon, which is proportional to the photon wavenumber. Here k designates the wavenumber of the photons that represent qubits, and k1 and k2 represent the wavenumbers of photons emitted by the atom during decay of the excited states, as described further below.

As is illustrated in FIG. 5A, a single photon is not absorbed by the atom because the energy change 520a provided by one photon does not match the energy level of the atomic energy state 512a. Absorption of one photon only reaches energy level 530a, indicated by the horizontal dashed line segment. Energy level 530a differs from the atomic energy state 512a, by the amount $\delta_1$ mentioned above. Single-photon absorption is eliminated by selecting the energy of level 2 to exceed the energy level 530a by the amount $\delta_1$. In this case only two-photon absorption satisfies energy conservation.

FIG. 5A also illustrates a virtual process in which the two original photons with wavenumber k are absorbed, followed by the re-emission of two different photons with wavenumbers k1 and k2. The emitted photons are easily distinguished from qubits. The emitted photons k1 has a smaller wavenumber (and optical frequency) than a qubit photon and the emitted photon k2 has a larger wavenumber (and optical frequency) than a qubit photon.

The absorption of the two qubit photons, or the reemission of photons with wavenumbers k1 or k2, is equivalent to a measurement that two coincident photons are present in the optical fiber core 222. According to the Zeno effect, such a measurement actually inhibits the occurrence of two coincident photons in the optical fiber core 222.

For a more complete understanding, the effects of collisions and the Doppler shift of the atoms should also be taken into account. Including all of these factors, the rate $R_2$ of absorption of a two-photon state can be described approximately with Equation 2:

$$R_2 = N_A f_\delta f_c f_P \frac{\sigma_0}{A} \frac{1}{\tau_3} \qquad (2)$$

Here $\tau_3$ is the natural lifetime of atomic level 3, $N_A$ is the number of atoms in a length $L_3 = C\tau_3$ of optical fiber, and the factors $f_\delta$, $f_c$, and $f_P$ take into account the effects of detuning, atomic collisions, and the length of the wave packets. Two-photon absorption is well understood; see, for example, R. W. Boyd, *Nonlinear Optics, 2nd edition*, Academic Press, New York, 2003, the entire contents of which are hereby incorporated by reference as if fully set forth herein. Equation 2 simply casts $R_2$ in a form that is useful for optical fiber applications. To achieve a useful Zeno effect, it is desirable to obtain a value on the order of 1 for the rate $R_2$.

Detuning the photons from the energy of atomic level 2 reduces $R_2$ by the factor $f_\delta$, which is given by Equation 3:

$$f_\delta = \left(\frac{M_{21}}{\delta_1}\right)^2 \qquad (3)$$

where $M_{21}$ is a matrix element for a transition from atomic level 1 to 2 accompanied by the absorption of a photon. Although this factor is relatively small, it can be offset by the large value of $N_A$ if we choose the number of atoms to be given by $N_A = 1/f_\delta$. A large value of $N_A$ is also desirable because the atomic density will become nearly uniform, and a perfectly uniform medium does not scatter any non-resonant photons.

The factor $f_c$ represents the fact that collisions will increase the linewidth of the atomic transition and thereby reduce the rate of transitions on resonance. It is given approximately by Equation 4:

$$f_c = \tau_c/\tau_3 \qquad (4)$$

where $\tau_c$ is the decoherence time due to collisions. This factor can range from 0.1 to 0.01 for typical atomic vapor transitions.

The factor $f_P$ reflects the fact that nonlinear absorption is proportional to the square of the field intensity, which increases as $L_P$ is decreased and the electromagnetic energy of a photon is concentrated into a smaller volume. This factor is given approximately by Equation 5:

$$f_P = c\tau_3 / L_P \tag{5}$$

The increased atomic line width due to collisions allows the length of the photon wave packets to be reduced to $L_P \sim c\tau_c$, in which case the product $f_c f_P \sim 1$.

For an optical fiber with a diameter of $0.78\lambda$, the factor $\sigma_0/A$ in Equation 2 is also equal to unity. Although commercially-available optical fibers have diameters that are somewhat larger than this, there is no fundamental reason why fibers with smaller cores cannot be manufactured and operated in a single mode. For example, see B. E. A. Saleh and M. C. Teich, *Fundamentals of Photonics*, Wiley, New York, 1991, p. 282, the entire contents of which are hereby incorporated by reference as if fully set forth herein. All of the factors in Equation 2 then cancel out and the net two-photon absorption rate is simply $R_2 \sim 1/\tau_3$, which corresponds to a two-photon absorption length $l_2$ (1/e distance) of $l_2 \sim c\tau_3$. Typical values of $l_2$ from this approach are expected to be on the order of 5 meters.

It may be possible to greatly reduce the absorption length below 5 meters using other mechanisms for two-photon absorption, such as the process illustrated in FIG. 5A in which the excited atom re-emits two photons with wavenumbers k1 and k2 that can differ from the initial wave vector.

If the error probability per gate operation is required to be less than some value $\epsilon$, then the results illustrated in FIG. 3 require that the $\sqrt{}$SWAP gates have a length $L_{1/2} > l_2/\epsilon$. To build devices of this kind the effects of dispersion and scattering over the required length of optical fiber should be minimized.

Figure 5B:
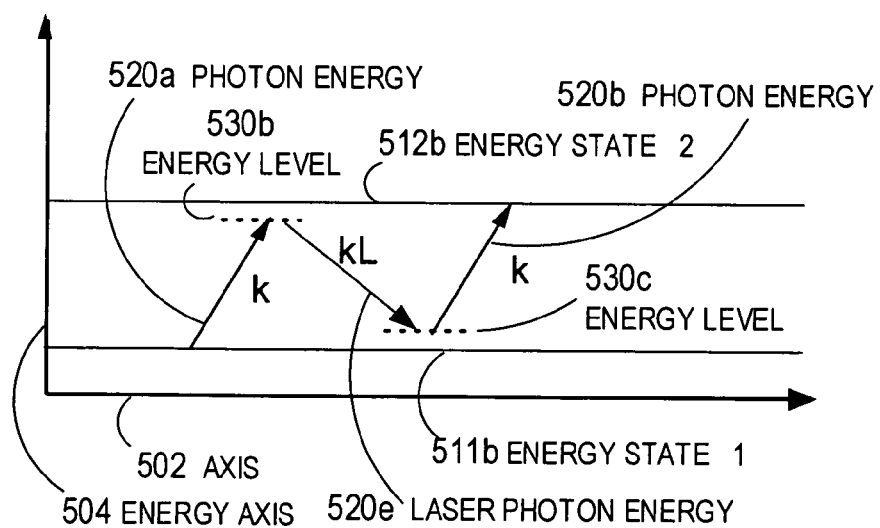
FIG. 5B is an energy diagram that illustrates the energy states of an absorbing atom for applying the Zeno effect by absorbing coincident photons but not single photons, according to another embodiment.

In most atomic systems, the matrix element $M_{32}$ from level 2 to level 3 is substantially smaller than the matrix element $M_{21}$ from level 1 to level 2. As a result, it may be advantageous to use a strong laser beam to eliminate the need for level 3. FIG. 5B is an energy diagram that illustrates the energy states of an absorbing atom for applying the Zeno effect by absorbing coincident photons but not single photons, according to another embodiment using lasers and only two atomic energy states. The atomic energy states 511b, 512b represent atomic energy levels 1 and 2, respectively, and may be the same or different from the atomic energy states 511a, 512a illustrated in FIG. 5A. The photon energies 520a, 520b, 520e are represented by arrows, the height of each arrow is proportional to the photon energy of the corresponding photon, which is proportional to the photon wavenumber. As in FIG. 5A, k designates the wavenumber of the photons that represent qubits. Here, kL represents the wavenumber of photons emitted by the atom in response to stimulation by a high intensity laser beam of photons with wavenumber kL. Photon energy 520e represents the energy of the photon with wavenumber kL. Energy is conserved by the absorption of two qubit photons with wavenumber k and the emission of a laser photon of wavenumber kL, leaving the atom in the final atomic energy state 512b.

As is illustrated in FIG. 5B, a single photon is not absorbed by the atom because the energy change 520a provided by one photon does not match the energy level of the atomic energy state 512b. Absorption of one photon only reaches energy level 530b, indicated by the horizontal dashed line segment. Energy level 530b differs from the atomic energy state 512b. Single-photon absorption is eliminated by selecting the energy of level 2 to exceed the energy of the photon with wavenumber k.

From virtual energy level 530b, the atom can emit a laser photon to put it at virtual energy level 530c, where it can absorb a second qubit photon to reach the stable atomic energy state 512b. In this case two-photon absorption satisfies energy conservation while solo photon absorption does not.

The density of atoms can be increased slightly to compensate for the small reduction in the matrix elements of the first transition, while retaining nearly the full value of $M_{21}$ for the second transition. As can be shown, this effectively allows $\tau_3$ to be replaced with the lifetime $\tau_2$ of level 2.

As mentioned above, the atomic density can be adjusted to compensate the detuning $\delta_1$ of the first atomic transition by satisfying Equation 6:

$$\sqrt{N_A} \frac{M_{21}}{\delta_1} \sim 1 \tag{6}$$

This can be shown to be equivalent to requiring that the atomic vapor produce a change $\delta n$ in the index of refraction of $\delta n \sim -\delta_1/\hbar\omega_0$, where $\hbar$ is Planck's constant and $\omega_0$ is the optical frequency of photons with wavenumber k. Imposing the condition of Equation 6 eliminates $N_A$, $M_{21}$, and $\delta_1$ from the final expression for the two-photon absorption length $l_2$. This value of $N_A$ is roughly the optimal value, since a single photon will have a probability of about 50% of being absorbed in a virtual atomic state (a "dressed state"), and larger values of $N_A$ are expected to be less effective.

A large value of $N_A$ is also desirable because the atomic density will become nearly uniform over the dimensions of a wavelength, and a perfectly uniform medium does not scatter any non-resonant photons. As an example, commercial optical fibers can transmit light over many kilometers with very little scattering, even though the interaction between the photons and the atoms in the core produces a phase shift of roughly $10^9$ radians per kilometer. A similar situation is expected here: in the limit of large $\delta_1$ and $N_A$, the losses due to single-photon scattering are expected to be relatively small. Fiber imperfections and impurities may still produce a significant amount of scattering, however.

Some applications of Zeno gates involve the production of special purpose dual-core optical fiber and appropriate coupling techniques. Conventional optical fibers require the index of refraction of the core to be higher than that of the cladding. For hollow-core fibers, this could be accomplished using the index of refraction created by the atomic vapor. Alternatively, hollow-core fibers based on photonic bandgap structures in the cladding are commercially available for wavelengths in the infrared. Another option is to replace the hollow core and atomic vapor with a conventional solid core doped with a suitable impurity, such as erbium.

The above estimates indicate that Zeno gates could be implemented using relatively short lengths of dual core fiber.

FIG. 6 is a block diagram that illustrates a square root SWAP gate 600 using the quantum Zeno effect, according to an embodiment. The gate 600 includes one optical fiber (not shown) with two doped cores 622a, 622b (collectively referenced hereinafter as optical fiber cores 622). The gate 600 also includes qubit input ports 102 and qubit output ports 104 and optical couplers 610, 630. The gate also includes laser 640. The two cores 622 are brought into close proximity over a distance L/2 indicated by line segment 227. The cores 622 are within a separation distance S of each other, indicated by line segment 224, over the distance L/2. The cores are doped with absorbing units, such as atom or molecules, which have excited states matched to the energy of two photons representing qubits minus the energy of laser photons emitted by laser 640, to carry on the two-photon absorption process of FIG. 5B.

The optical coupler 610 couples the input qubit on port 102*a* into the core 622*a* of the optical fiber, couples the input qubit on port 102*b* into the core 622*b* of the optical fiber, and couples laser photons from laser 640 into both cores 622 of the optical fiber. Any optical elements known in the art may be used in optical coupler 610, including but not limited to lenses, mirrors, beam splitters, optical fibers, and phase shifters.

The optical coupler 630 couples the qubit in the core 622*a* of the optical fiber to output qubit on port 104*a*, couples the qubit in the core 622*b* of the optical fiber to output qubit port 104*b*, and filters out laser photons from laser 640 in both cores 622 of the optical fiber. Any optical elements known in the art may be used in optical coupler 630, including but not limited to lenses, mirror, beam splitters, optical fibers, and phase shifters.

In some embodiments, the laser 640 is external to the gate 600, and the square root SWAP gate includes, instead, a port for receiving laser photons generated by the external laser into optical coupler 610. In summary, the quantum Zeno effect is used to implement a new kind of quantum logic gate for qubits represented by single photons. No actual measurements are required and two-photon absorption in dual-core optical fibers, for example, suffice for the construction of a $\sqrt{\text{SWAP}}$ gate. An optical gate of this kind has a number of practical advantages in quantum information processing, including the ability to connect logic and memory devices using optical fibers, the reduction of complexity associated with large number of ancilla, and the elimination of the need for multiple highly reliable single photon detectors.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for quantum logic operations wherein each qubit is represented by a superposition state of single photon, comprising the steps of:
   directing one or more input qubits onto a device; and
   applying a quantum Zeno effect in the device by consuming one or more photons in the device under conditions in which one or more output photons that would otherwise be output by the device do not represent a result of a particular quantum logic operation on the one or more input qubits.

2. The method as recited in claim 1, wherein:
   said step of directing one or more input qubits onto a device comprises directing at least two input qubits onto the device; and
   the particular quantum logic operation includes a square root of a SWAP operation.

3. The method as recited in claim 2, said step of consuming one or more photons in the device comprising absorbing a pair of substantively coincident photons in one spatial mode through the device without absorbing a pair a solo photon in the one spatial mode.

4. The method as recited in claim 3, said step of absorbing a pair of substantively coincident photons in one spatial mode through the device without absorbing a solo photon in the one spatial mode comprising causing photons to impinge on an absorbing unit comprising at least one of an atom and a molecule and an ion having an excited state, wherein the excited state is matched to a total energy from the pair of substantively coincident photons and the excited state is not matched to an energy of the solo photon.

5. The method as recited in claim 4, said step of causing photons to impinge on the absorbing unit further comprising the step of disposing a vapor of the absorbing unit in a hollow core optical fiber serving as the one spatial mode.

6. The method as recited in claim 4, said step of causing photons to impinge on the absorbing unit further comprising the step of doping the core of an optical fiber serving as the one spatial mode with the absorbing unit.

7. The method as recited in claim 3, said step of absorbing a pair of substantively coincident photons in one spatial mode through the device without absorbing a solo photon in the one spatial mode comprising causing photons to impinge on an absorbing unit comprising at least one of an atom and a molecule and an ion having an excited state, which state is matched to a total energy from the pair of substantively coincident photons less a first energy associated with a laser photon that propagates in the one spatial mode from a laser, and which state is not matched to a second energy of the solo photon.

8. The method as recited in claim 2, wherein the square root of the SWAP operation comprises propagating the two input qubits along two spatial modes separated by a sufficiently small separation distance for a particular distance in the direction of propagation such that a photon would transfer from a first spatial mode to a different second spatial mode over twice the particular distance when separated by the separation distance.

9. The method as recited in claim 1, said step of consuming one or more photons in the device comprising causing one or more photons to undergo a nonlinear phase shift in a high-finesse cavity.

10. A device for quantum logic operations wherein each qubit is represented by a superposition state of a single photon, comprising:
    an input port for receiving one or more input qubits;
    an output port for sending one or more output qubits; and
    a Zeno effect component disposed between the input port and the output port,
    wherein the Zeno effect component applies a quantum Zeno effect by consuming one or more photons under conditions in which photons on the output port would otherwise not represent a result of a particular quantum logic operation on the one or more input qubits.

11. The device as recited in claim 10, wherein:
    the input port is configured for receiving two input qubits onto the device; and
    the particular quantum logic operation includes a square root of a SWAP operation.

12. The device as recited in claim 11, the Zeno effect component for performing the square root of the SWAP operation further comprising a particular pair of wave guides separated by a sufficiently small separation distance for a particular distance in a direction of propagation such that a SWAP operation would occur in twice the particular distance for a single test photon.

13. The device as recited in claim 12, wherein said Zeno effect component absorbs a pair of substantively coincident photons in a wave guide of the pair of wave guides without absorbing a solo photon in the same wave guide.

14. The device as recited in claim 13, said Zeno effect component comprising a plurality of absorbing units in the wave guide, each absorbing unit comprising at least one of an atom and a molecule and an ion having an excited state which is matched to a total energy from the pair of substantively coincident photons and which state is not matched to an energy of the solo photon.

15. The device as recited in claim 14, said Zeno effect component further comprising:
   an optical fiber as the wave guide, wherein the optical fiber includes a hollow core; and
   a vapor of the absorbing atoms disposed in the hollow core.

16. The device as recited in claim 14, said Zeno effect component further comprising an optical fiber as the wave guide, wherein the optical fiber is doped with the absorbing atoms.

17. The device as recited in claim 13, wherein:
   the device further comprises a laser for producing a beam of laser photons, each laser photon having a first energy;
   the Zeno-effect component further comprises:
      an optical coupler for propagating the beam of laser photons through the wave guide; and
      a plurality of absorbing units in the wave guide, each absorbing unit comprising at least one of an atom and a molecule and an ion having an excited state, wherein the excited state
         is matched to a total energy from the pair of substantively coincident photons less the first energy; and
         is not matched to a second energy of the solo photon.

18. The device as recited in claim 10, wherein:
   the Zeno effect component comprises a high-finesse cavity; and
   the high-finesse cavity consumes one or more photons by causing the one or more photons to undergo a nonlinear phase shift.

19. A method of fabricating a Zeno effect component for quantum logic operations wherein each qubit is represented by a superposition state of a single photon having a particular energy, comprising:
   forming a pair of wave guides separated by a sufficiently small separation distance for a particular distance in a direction of propagation such that a SWAP operation would occur in twice the particular distance for a single test photon having the particular energy; and
   disposing in each wave guide a plurality of absorbing units, each absorbing unit comprising at least one of an atom and a molecule and an ion having an excited state which is matched to twice the particular energy and which state is not matched to the particular energy.

20. The method as recited in claim 19, wherein:
   said step of forming a pair of wave guides further comprising forming two hollow cores in a fiber optic cladding; and
   said step of disposing a plurality of absorbing units further comprising inserting in each hollow core a vapor of the absorbing units.

21. The method as recited in claim 19, wherein:
   said step of forming a pair of wave guides further comprising forming two solid cores in a fiber optic cladding; and
   said step of disposing a plurality of absorbing units further comprising doping each solid core with the absorbing units.

* * * * *